June 1, 1954 K. KANDIAH 2,679,978

PULSE SCALING SYSTEM

Filed Jan. 19, 1951

Inventor
KATHIRKAMATHAMBY KANDIAH,
By
Robert B. [signature]
Attorney

Patented June 1, 1954

2,679,978

UNITED STATES PATENT OFFICE 2,679,978

PULSE SCALING SYSTEM

Kathirkamathamby Kandiah, Strand, London, England, assignor, by mesne assignments, to National Research Development Corporation, London, England, a corporation of Great Britain Application January 19, 1951, Serial No. 206,820

Claims priority, application Great Britain January 25, 1950

6 Claims. (Cl. 235—92)

Figure 1:
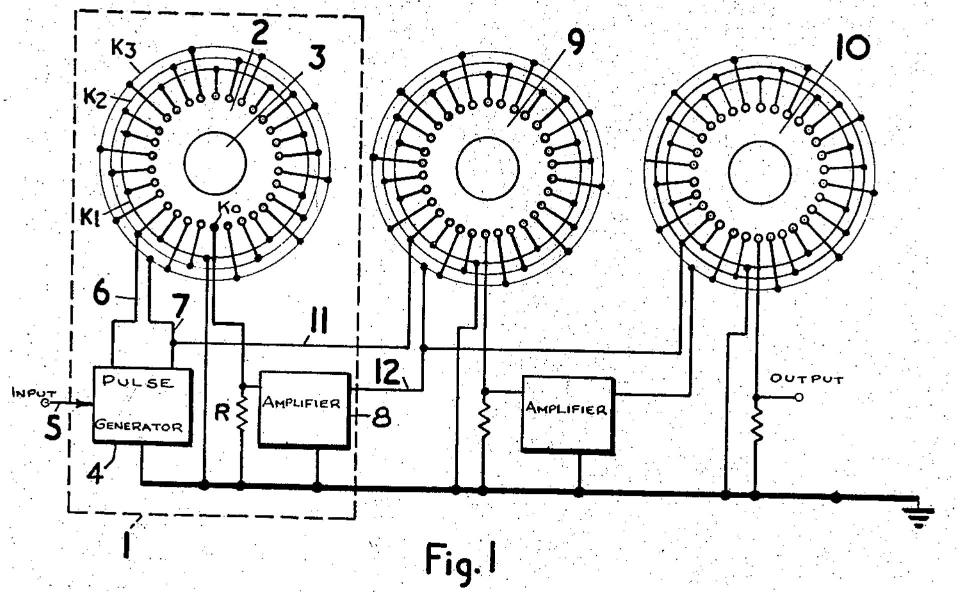

This invention relates to pulse scaling systems embodying multi-electrode gaseous-discharge tubes of the type having a plurality of stable discharge paths which can be set up in an endless sequence by the application of voltage changes to each of two or three electrode groups in turn.

Such tubes are hereinafter referred to as multi-electrode scaling tubes.

One such pulse scaling system is described in an article "Polycathode Glow Tube for Counters" by J. J. Lamb and J. A. Brustman (Electronics, McGraw-Hill Publishing Company, November 1949, pages 92 to 96).

A characteristic of such systems is that each incoming pulse is applied to develop first and second transfer pulses, one delayed with respect to the other by an amount less than the deionisation time of the tube; these transfer pulses being applied to respective transfer electrode groups to step the discharge in a determined sense from one to another electrode element of a third (or primary) electrode group. The arrangement is also such that an output pulse is delivered from the output electrode in the primary electrode group for each cycle of steps in the discharge tube. Hence, in the case of decade counting, every tenth incoming pulse gives rise to an output pulse. The output pulses can be applied to a second similar stage for counting in the next higher decade or scale.

Simplification is gained in multi-stage (including two stage) arrangements in accordance with the present invention by applying the second transfer pulses and the output pulses of one stage as first and second transfer pulses respectively to the next succeeding stage.

The discharge in the succeeding stage then advances and recedes repeatedly on its first transfer pulse until an output pulse from the preceding stage, acting as the second transfer pulse, arrives to complete the step. That output pulse results from one of the second transfer pulses in the first stage and therefore follows closely and necessarily has the timing required to complete the step.

Since each succeeding stage derives both its transfer pulses from the preceding stage, the succeeding stages can be constituted simply by a scaling tube and an amplifier tube with their coupling resistances and condensers. The amplifier is in most cases necessary to raise the level of the output pulse of the preceding stage; it may consist of a triggered cold cathode gaseous discharge tube.

In the first stage, means for deriving first and second transfer pulses are necessary and may take the form of two triggered cold cathode tubes with a coupling of chosen time constant.

In one form the invention provides a multi-stage scaler comprising a pulse generator, a first multi-electrode scaling tube of the type set forth coupled to said generator to receive transfer pulses therefrom and one or more succeeding multi-electrode scaling tubes each deriving its transfer pulses from preceding scaling tubes. In another form, the invention provides a multi-stage scaler comprising a pulse generator, a first multi-electrode scaling tube of the type set forth coupled to said generator to receive first and second transfer pulses therefrom and one or more succeeding multi-electrode scaling tubes each deriving its second transfer pulse from the output pulse from the immediately preceding scaling tubes and its first transfer pulse from the source providing the second transfer pulse to said preceding tube.

Each scaling tube is preferably followed by an amplifier tube for transmitting its output pulse. All of the tubes including those in the generator are preferably of the cold cathode type.

Figure 2:
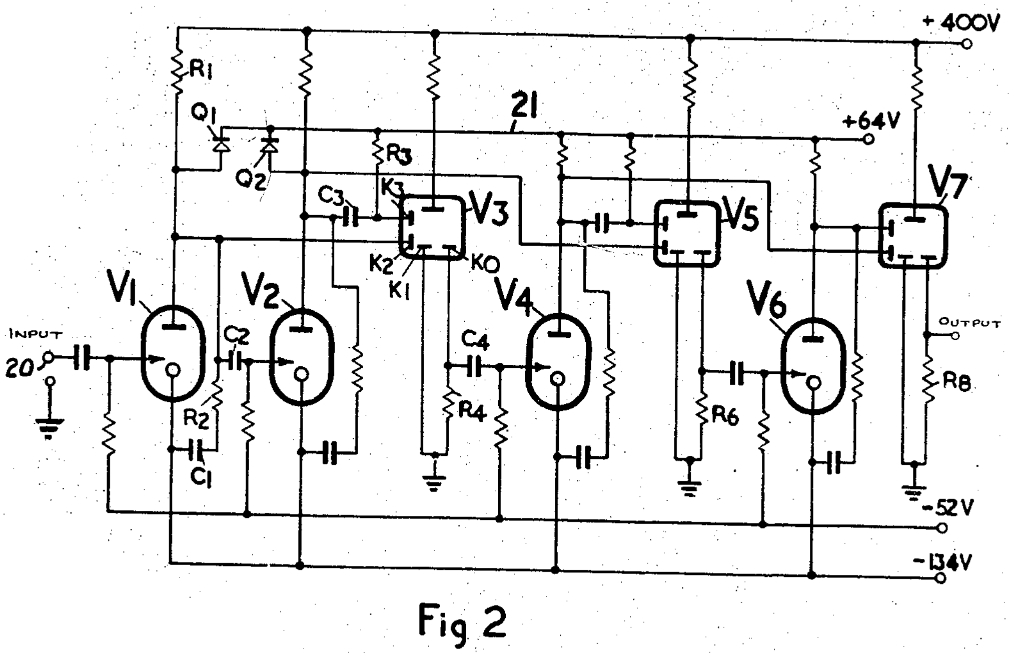

The invention will be further described with reference to the accompanying drawing in which Fig. 1 is a block diagram of a three-stage decimal scaler embodying the invention, and Fig. 2 is a circuit diagram showing one form which the arrangement of Fig. 1 may take.

In Fig. 1 the first stage 1 comprises a scaling tube 2 having an anode 3 and a ring of thirty cathode elements inter-connected in three groups $K_1$, $K_2$, $K_3$. The first group $K_1$, which may be termed the primary cathode, is connected to ground. Groups $K_2$ and $K_3$ are the first and second transfer cathode groups respectively. A single cathode element $K_0$, properly belonging to the primary cathode, has a separate connection to earth through a resistance R to develop an output voltage and to facilitate zero setting. Resistance R is coupled to an amplifier so that a voltage change in resistance R results in a pulse at the output of the amplifier.

A delayed-pulse generator 4 has incoming pulses applied to it at input 5 and delivers two amplified negative-going pulses, which will be referred to as transfer pulses, for each incoming pulse. The first transfer pulse, which may be co-incident with the incoming pulse, is applied via a line 6 to the second cathode group $K_2$ (that is, the first transfer cathode group) and the second transfer pulse, delayed in time with respect to the first, is applied via a line 7 to the third cathode group $K_3$ (that is, the second transfer cathode group). The delay time between the pulses must not exceed a limit that would allow the tube 2 to de-ionise.

If a glow discharge exists initially between the anode and the output cathode element $K_0$, it will be stepped in a determined sense (clockwise in the figure) by the transfer pulses. At the end of the second transfer pulse, the discharge moves to the first cathode element of group $K_1$ if the bias on the groups $K_2$ and $K_3$ are suitably chosen. The tenth incoming pulse yields transfer pulses which bring the discharge back to its initial position on element $K_0$ and the resulting current flow through resistance R produces a pulse in the output circuit of amplifier 8.

The pulse scaling system as known hitherto, and referred to above, comprises several stages each similar to the stage 1.

In the arrangement of Fig. 1, however, each succeeding stage, comprising a scaling tube 9 or 10, takes its transfer pulses directly from the preceding stage so that further delayed-pulse generators are dispensed with. As shown, the pulses applied to cathode group $K_3$ of the first stage are also applied via a line 11 to the second cathode group (that is, the first transfer cathode group) of tube 9 and the output pulse from amplifier 8 is applied via line 12 to the third cathode group (that is, the second transfer group) of tube 9.

In the circuit arrangement of Fig. 2, which is a preferred elaboration of the block diagram of Fig. 1, cold-cathode gaseous-discharge tubes are employed as amplifiers and for the generation of a delayed pulse. A simple and compact instrument, very economical in power consumption, results.

Referring to Fig. 2, incoming pulses to be counted or scaled are applied in positive-going sense to input terminal 20. Each pulse exceeding a determined amplitude triggers the cold-cathode gaseous discharge tube V1. In consequence, the anode potential falls and with it the potential of cathode group $K_2$ of scaling tube V3 so that the discharge in that tube, which is resting on one of the cathodes of the primary cathode group $K_1$, is shifted to the adjacent cathode which is in group $K_2$, that is, it moves one sub-step. The discharge in tube V1 is brief; it terminates as soon as the voltage across a condenser C1 falls below the maintaining voltage. Thereupon the anode potential rises at a rate determined by the time constant of resistances R1, R2 and condenser C1. A condenser C2 applies this rising voltage to trigger a second gaseous-discharge tube V2. Discharge in this tube V2 results in a negative anode pulse which is applied by a condenser C3 to cathode group $K_3$ of scaling tube V3 so that the discharge is shifted to the adjacent cathode which is in group $K_3$, that is, it moves another sub-step. When this pulse decays, the discharge in tube V3 shifts to reach the adjacent cathode of the primary cathode group $K_1$, which is more negative with respect to the anode than the other cathode groups $K_2$, $K_3$. Hence, each pulse exceeding a determined amplitude applied at input terminal 20 moves the discharge in tube V3 one step from one cathode of the primary group $K_1$ to the next cathode of that group.

Rectifiers Q1, Q2 connected between the anodes of tubes V1, V2 and a positive supply line 21 limit the positive excursion of the anode voltages.

Every tenth incoming pulse brings the discharge in the scaling tube V3 to the cathode element $K_0$. The resulting voltage rise in a cathode resistance R4 is applied through a condenser C4 to trigger a third gaseous discharge tube V4 and a brief negative output pulse results at the anode of tube V4.

A second-stage scaling tube V5 receives the negative pulses from the anode of tube V2 as first transfer pulses. It also receives the negative pulses from tube V4 as second transfer pulses. Hence the discharge in tube V5 makes one step for each tenth incoming pulse and passes a current through its output resistance R6 for each hundredth incoming pulse. This current growth produces an output pulse at the anode of an amplifier tube V6.

The third stage comprises a scaling tube V7 which receives a first transfer pulse from the anode of tube V4 and a second transfer pulse from the anode of tube V6. It marks every thousandth incoming pulse by a current flow in its output resistance R8 which may be indicated in any convenient way, for example, by developing a short pulse by means of a tube such as V4 or V6 and applying the pulse to a mechanical recorder or to another scaling tube stage.

It will be noted that the pulse at the anode of tube V2 is applied by means of a direct connection to tube V5 but by means of network C3, R3 to tube V3. This network hastens the decay of the second transfer pulse on tube V3 and so advances the output pulse from tube V3 and the second transfer pulse on tube V5. This ensures that the second transfer pulse arrives at tube V5 before the first transfer pulse has decayed.

It will also be noted that when the discharge in the scaling tube V5 is at the output cathode element, it is repeatedly diverted to the adjacent cathode which is in the second cathode group. Hence the output wave form is an interrupted one. It is therefore necessary to arrange the coupling time constant between the output cathode element and the succeeding trigger electrode to be such that the triggered tube operates only on the first positive-going edge of the wave form of the output cathode. The same effect arises in tube V7 and it follows that the coupling time constants should be progressively larger from stage to stage.

I claim:

1. A multi-stage scaler comprising a first multi-electrode scaling tube of the type having three cathode groups consisting of a primary cathode group, first and second transfer cathode groups and an output cathode which is one cathode of the primary cathode group, a connection common to all cathodes in the primary group except the output cathode, a connection common to all cathodes in the first transfer group and a connection common to all cathodes in a second transfer group, a pulse generator having two triggered gaseous discharge tubes for generating for each input pulse applied thereto two output pulses, the first delayed relative to the second by an amount less than the deionisation time of said first multi-electrode scaling tube, a connection for the first of said output pulses to said first transfer cathode group and a connection for the second of said output pulses to the second transfer cathode group, loading means for said output cathode for setting up a transfer voltage when the discharge arrives at that cathode, an amplifier for said transfer voltage, a connection from the output of said amplifier to a second transfer cathode group of a second similar multi-electrode scaling tube and a connection from the second transfer cathode group of said first multi-electrode scaling tube to the first transfer cathode group of said second multi-electrode scaling tube.

2. A multi-stage scaler according to claim 1 wherein said connection from the output of said amplifier includes a resistance-capacity input to the second transfer cathode group of said second multi-electrode scaling tube.

3. A multi-stage scaler comprising a multi-electrode scaling tube of the type having three cathode groups consisting of a primary cathode group, first and second transfer cathode groups and an output cathode which is one cathode of the primary cathode group, a connection common to all cathodes in the primary group except the output cathode, a connection common to all cathodes in the first transfer group and a connection common to all cathodes in second transfer group, a pulse generator of the type producing for each input pulse an output pulse at a first output and a delayed output pulse at a second output having a delay less than the deionisation time of said scaling tube, connections from said first and second outputs to said first and second transfer cathode groups respectively, at least one succeeding similar multi-electrode scaling tube and connections from the second transfer cathode groups and output cathode of each preceding tube to the first and second transfer cathode groups respectively of the succeeding tube.

4. A multi-stage scaler as claimed in claim 3 wherein the connection from the output cathode group of each preceding tube to the second transfer cathode group of the succeeding tube includes an amplifier connected in a sense to amplify the signals generated at the output cathode before connecting them to the second transfer cathode group of the succeeding tube.

5. A multi-stage scaler as claimed in claim 4 wherein said amplifier comprises a gaseous discharge tube having a starting electrode.

6. A multi-stage scaler as claimed in claim 5 having a resistance-capacity output coupling between each output cathode of the scaling tubes and said starting electrode of time constant such that said gaseous discharge tube is started only on the first positive-going edge of the waveform at said output cathode.

References Cited in the file of this patent

UNITED STATES PATENTS

| Number | Name | Date |
|---|---|---|
| 2,443,407 | Wales | June 15, 1948 |
| 2,473,159 | Lyman | June 14, 1949 |
| 2,505,006 | Reeves | Apr. 25, 1950 |
| 2,575,370 | Townsend | Nov. 20, 1951 |

OTHER REFERENCES

Article: "A New Cold-Cathode Counting or Stepping Tube" from Bell Telephone System, Monograph #1772 by M. A. Townsend dated September 1950.